(12) United States Patent  
Barraclough et al.

(10) Patent No.: US 9,027,010 B2  
(45) Date of Patent: May 5, 2015

(54) RUNTIME OPTIMIZATION USING META DATA FOR DYNAMIC PROGRAMMING LANGUAGES

(71) Applicant: Apple Inc., Cupertino, CA (US)

(72) Inventors: Gavin Barraclough, Santa Clara, CA (US); Filip J. Pizlo, Capitola, CA (US)

(73) Assignee: Apple Inc., Cupertino, CA (US)

( * ) Notice: Subject to any disclaimer, the term of this patent is extended or adjusted under 35 U.S.C. 154(b) by 125 days.

(21) Appl. No.: 13/725,281

(22) Filed: Dec. 21, 2012

(65) Prior Publication Data

US 2013/0205286 A1 Aug. 8, 2013

Related U.S. Application Data

(60) Provisional application No. 61/594,983, filed on Feb. 3, 2012, provisional application No. 61/599,309, filed on Feb. 15, 2012.

(51) Int. Cl.
*G06F 9/45* (2006.01)
*G06F 11/36* (2006.01)
*G06F 9/455* (2006.01)

(52) U.S. Cl.
CPC .............. *G06F 8/443* (2013.01); *G06F 8/4441* (2013.01); *G06F 11/3612* (2013.01); *G06F 8/447* (2013.01); *G06F 9/45516* (2013.01)

(58) Field of Classification Search
CPC ..... G06F 8/443; G06F 8/447; G06F 9/45516; G06F 11/3612
USPC .................................................. 717/153–157
See application file for complete search history.

(56) References Cited

U.S. PATENT DOCUMENTS

| | | |
|---|---|---|
| 5,283,878 A | 2/1994 | Murray |
| 5,428,761 A | 6/1995 | Herlihy et al. |
| 5,940,618 A | 8/1999 | Blandy et al. |
| 6,003,123 A | 12/1999 | Carter et al. |
| 7,107,430 B2 | 9/2006 | Grossman et al. |

(Continued)

FOREIGN PATENT DOCUMENTS

| | | |
|---|---|---|
| WO | WO 2011/049553 A1 | 4/2011 |
| WO | WO 2012/015671 A1 | 2/2012 |

OTHER PUBLICATIONS

Chang et al., "Tracing for Web 3.0, Trace Compilation for the Next Generation Web Applications", ACM, 2009, 10pg.*

(Continued)

*Primary Examiner* — Ryan Coyer
(74) *Attorney, Agent, or Firm* — Blakely, Sokoloff, Taylor & Zafman LLP

(57) ABSTRACT

A method and an apparatus that optimize operations for a key among a collection of key indexed data structures using meta data describing properties of the key with respect to the collection of data structures are described. The meta data may correspond to a cache dynamically updated to indicate invariants which are true for the key in a current state of the collection of data structures. Expensive calculations to search through the collection of data structures for the key may be avoided. For example, costly lookup operations over a collection of data structures may not be required at all if a key is known to always (or to never) reference certain specific values, or for these values to have certain meta-properties, in any of the collection of data structure globally throughout a system at a current state.

21 Claims, 16 Drawing Sheets

(56) References Cited

U.S. PATENT DOCUMENTS

| | | | |
|---|---|---|---|
| 7,171,693 | B2 | 1/2007 | Tucker et al. |
| 7,181,580 | B2 | 2/2007 | Erickson et al. |
| 7,366,914 | B2 | 4/2008 | Graunke |
| 7,802,236 | B2 | 9/2010 | Calder et al. |
| 7,804,503 | B2 | 9/2010 | Fernandez et al. |
| 7,840,950 | B2 | 11/2010 | Stoodley et al. |
| 7,996,671 | B2 | 8/2011 | Chheda et al. |
| 8,549,488 | B2 | 10/2013 | Dick et al. |
| 2002/0194184 | A1 | 12/2002 | Baskins et al. |
| 2003/0126590 | A1 | 7/2003 | Burrows et al. |
| 2004/0255282 | A1 | 12/2004 | Eruhimov et al. |
| 2007/0061790 | A1* | 3/2007 | Kay et al. ............... 717/145 |
| 2009/0019458 | A1 | 1/2009 | Katari et al. |
| 2010/0088682 | A1 | 4/2010 | Inakoshi |
| 2010/0095284 | A1 | 4/2010 | Herring et al. |
| 2010/0198799 | A1 | 8/2010 | Krishnan et al. |
| 2010/0325607 | A1* | 12/2010 | Meijer et al. ............ 717/106 |
| 2011/0314452 | A1 | 12/2011 | Tillmann |
| 2012/0131559 | A1* | 5/2012 | Wu et al. ................ 717/132 |
| 2013/0145216 | A1 | 6/2013 | Eggers et al. |

OTHER PUBLICATIONS

Gal et al., "Trace-based Just-in-Time Type Specialization for Dynamic Languages", ACM, 2009, 14pg.*

Hayashizaki et al., "Improving the Performance of Trace-based Systems by False Loop Filtering", ACM, 2011, 14pg.*

Richards et al., "An Analysis of the Dynamic Behavior of JavaScript Programs", ACM, 2010, 12pg.*

Bala, Vasanth et al., "Dynamo: a transparent dynamic optimization system," Proceeding PLDI '00, Proceedings of the ACM SIGPLAN 2000 conference on Programming language design and implementation, May 2000, 12 pages.

PCT International Preliminary Report on Patentability for PCT/US2013/024193, mailed Aug. 14, 2014.

PCT International Preliminary Report on Patentability for PCT/US2013/024198, mailed Aug. 14, 2014.

International Search Report and Written Opinion of the International Searching Authority, mailing date May 6, 2013, for corresponding International Application No. PCT/US2013/024193, 12 pages.

Agesen et al., "Type Feedback Vs. Concrete Type Intereference: A Comparison of Optimization Techniques for Object-Oriented Languages", Oct. 30, 1995, pp. 91-107, vol. 30, No. 10, New York, New York.

Arnold et al., "A Framework for Reducing the Cost of Instrumented Code", 2001 ACM Sigplan Conference on Programming Language Design and Implementation (PLDI '01), Jun. 20-22, 2001, 12 pages, Snowbird, Utah.

PCT International Search Report and Written Opinion for corresponding International Application No. PCT/US2013/024198, mailing date Jun. 13, 2013, 14 pages.

Gal, Andreas et al., "Trace-based Just-in-Time Type Specialization for Dynamic Languages," Proceedings of The 2009 ACM Sigplan Conference on Programming Language Design and Implementation, Jun. 15, 2009, vol. 44, pp. 465-478.

Wingo, A, "JavaScriptCore, the WebKit JS implementation," Oct. 28, 2011, pp. 1-12, http://wingolog.org/archives/2011/10/28/javascriptcore-the-webkit-js-implementation.

Chambers, Craig et al., "An Efficient Implementation of SELF, A Dynamically-Typed Object-Oriented Language Based on Prototypes", Proceedings of the Object Oriented Programming Systems Languages and Applications Conference. (OOPSLA). New Orleans, Oct. 1-6, 1989, vol. 24, No. 10, pp. 49-70.

Feustel, "On the Advantages of Tagged Architecture", IEEE Transaction on Computers, vol. C-22, No. 7, Jul. 1973.

Gudeman, "Representing Type Information in Dynamically Typed languages", Oct. 1993.

Johnson, "Trap Architectures for Lisp Systems", 1990 ACM 089791-368-X/90/0006/0079.

Steenkiste et al., Tags and Type Checking in LISP: Hardware and Software Approaches, 1987 ACM 0-89791-238-1/87/1000-0050.

Suganuma et al., "A Region-Based Compilation Technique for a Java Just-In-Time Compiler", ACM, 2003, 11 pg.

* cited by examiner

400

Randomly determining whether to trace a value V specified in a source code (e.g. for a store or assignment operation), the value V associated with an origin O (e.g. line number indicating where V is created) in the source code 401

If the value V is determined to be traced, allocating tracer data in a memory to store the value V and the origin O according to a traceable bullet type (e.g. a known type having two 64 bit words), the tracer data pointed to by a pointer having a tag indicating the tracer data (e.g. the traceable bullet type) 403

Accessing the value V via a pointer for a destination D (e.g. indicating a code location in a function passed with the value V) 405

Determining if the pointer to V points to tracer data, for example, according to the tag indicating the traceable bullet type 407

If the pointer points to tracer data, loading the origin O (e.g. 8 bytes offset from the value V) from the tracer data (e.g. slow path) 409

If a tracer graph G includes an edge E directed from O to D, updating a weight of edge E (e.g. by one) 411

Otherwise, updating the tracer graph with the edge E with initial weight (e.g. 1) 413

Loading the value V from the tracer data for the destination D 415

In response to accessing a property indexed by a key for a data object during runtime executing a code, the runtime having a runtime state with currently allocated data objects including the data object, inspecting key meta data for the key to determine whether to perform lookup operations among the currently allocated data objects using the key, the key meta data describing invariants which are globally true for the key among the currently allocated data objects 601

Performing accessing operations for the property on the data object directly without performing lookup operations on the currently allocated data objects in the runtime state if the invariants of the key satisfy certain conditions 603

Updating the key meta data for the key to maintain consistency between the invariants of the key and the runtime state updated with the access operations on the data object 605

Fig. 6

Type Embedded Pointer 1105

| 0 | 0 | 0 | f | 0 | 0 | 0 | 0 | a | b | c | d | 1 | 4 | 5 | 0 |

Known Type 1111

| 0 | 0 | 0 | 0 | 0 | 0 | 0 | 0 | 0 | 0 | 0 | 0 | 0 | 0 | 0 | f |

Configured Pointer: e.g. (Type Embedded Pointer) − (Known Type) * 2 ^ 48   1113

| 0 | 0 | 0 | 0 | 0 | 0 | 0 | 0 | a | b | c | d | 1 | 4 | 5 | 0 |

1400

Dynamically tracking a proportion of un-trusted code vs trusted code in an already emitted code stream for generating executable code to compile a source code 1401

Determining a next code ready for emission is trusted or not 1403

If the next code is not trusted, randomly determine whether to morph the next code, for example, based on the proportion of un-trusted code, to allow non-deterministic adjustment of amount of randomization in the emitted code stream for improving execution performance for the emitted code stream 1405

If the next code is selected for randomization, performing randomization operations on the next code to hide potential un-trusted executable instructions embedded in the next code 1407

Emitting the randomized next code to the code stream for execution 1409

XOR 1, EAX  ⟹  XOR 57383, EAX
1501                XOR 57382, EAX    } 1503

Fig. 15A

```
trustedBytes = 0                                          1500B
untrustedBytes = 0;
for each generated value b:
    if (b is trusted)
1509 →  emit(b);
        trustedBytes = trustedBytes + 1;
        continue;
    if (not shouldHardenUntrustedValue(b))
        emit(b);
        untrustedBytes = untrustedBytes + 1;
        continue;
1511 → emitHardenedValue(b);
1513 → untrustedBytes = decayUntrustedByteCount(untrustedByteCount);

function shouldHardenUntrustedValue(b)
    if (b is a safe value)
        return false;
1505 → proportionOfUntrustedContent = untrustedBytes / trustedBytes;
1507 → if (proportionOfUntrustedContent < randomNumber() * EnviromentSafetyHeuristic)
        return false;
    return true;
```

Fig. 15B

RUNTIME OPTIMIZATION USING META DATA FOR DYNAMIC PROGRAMMING LANGUAGES

CROSS-REFERENCE TO RELATED APPLICATIONS

This application is related to, and claims the benefits of, U.S. Provisional Patent Application No. 61/594,983, filed Feb. 3, 2012, entitled "RUNTIME COMPILATION FOR DYNAMIC PROGRAMMING LANGUAGES", by Filip Pizlo et al., U.S. Provisional Patent Application No. 61/599,309, filed Feb. 15, 2012, entitled "RUNTIME COMPILATION FOR DYNAMIC PROGRAMMING LANGUAGES", by Filip Pizlo et al., both of which are hereby incorporated by reference herein in their entirety.

FIELD OF INVENTION

The present invention relates generally to runtime compilation. More particularly, this invention relates to meta data based runtime optimization for dynamic language based source code.

BACKGROUND

Dynamic languages that lack type annotations of any kind are increasingly popular. For example, JavaScript has become the lingua franca of the World Wide Web, while Ruby, Python, Perl, and PHP have become standard languages for server-side infrastructure. However, runtime of dynamic language based code may require significant overhead as optimal compilation strategies may not be available to compile the code.

For example, JavaScript does not allow a program to specify type of variable. Thus, during runtime, a variable may be dynamically converted into separate types in different execution paths. Such conversions may be computationally expensive with high impact of overall performance. Further, dynamically created data types may require significant lookup or search operations among indexed data structures, such as dictionaries, to assign a type to a data or to access property of data of a certain type.

Furthermore, modern JavaScript engines are required to execute un-trusted code very quickly, and for this reason use runtime code generation through mechanisms such as Just In Time (JIT) compilation, which may be used by an attacker to bypass OS/hardware protection. Existing protection techniques, such as constant blinding, may be adopted to block such attacks. However, these techniques may incur performance costs, both in terms of memory use and processor execution time, on a target code regardless of the risk of the target code being executed.

Therefore, traditional dynamic runtime compilation approaches tend to be costly, inefficient and non-optimized.

SUMMARY OF THE DESCRIPTION

Tracer data (e.g. heap-allocated cell or a tracer bullet) may be randomly and infrequently allocated to analyze values flowing from origin and destination code locations for optimizing compiled code. A tracer data may include or box a value and corresponding origin (or provenance) of the value in a source code or program. The origin of the value may indicate where in the source code the value is produced. In one embodiment, the tracer data may be created when the value is stored in memory during runtime. The provenance may be a pointer-width word identifying the code location (e.g. line number) for storing the value. A special type or tag may be associated with a tracer data to force code execution or operations which use (or access, reference) the tracer data to take a slow-path as existing type checking in the source code may fail against the tracer data. The slow path may record a link between the origin (or source) code location of the value in the tracer data and the sink (or destination) code location where the tracer data is being used. The link may be assigned with a weight to indicate number of times the value has passed (or traced) through the link.

In one embodiment, a probability data flow graph may be generated based on links recorded between origin and destinations code locations of values during runtime. Each edge of the graph may be weighted to correspond to a relative probability of a value flow taking the edge. How the values flow through programs and how frequently different operations that use those values execute may be identified from the probability data flow graph. As a result, the probability data flow graph may provide a probabilistic view of runtime executing a program to uncover optimization opportunities for runtime compilation.

In one embodiment, optimization operations on a runtime compiler may be performed according to a probability data flow graph. For example, integer paths may be converted to floating point paths if values flowing through the integer paths are more likely to be used for floating point computation Likewise, an integer stored in floating point format may be converted to an integer format if it is highly likely (e.g. based on the probability data flow graph) to be later used for integer computation. Alternatively, if an integer heap store (e.g. values in integer format) has a high probability of flowing into a floating point load, a compiler may be optimized to the heap store in as floating point data instead, albeit with additional type checking operations to ensure soundness.

In one embodiment, operations using a key among a collection of key indexed data structures (e.g. dictionaries, hash tables, associated arrays etc.) may be optimized using meta data describing properties of the key with respect to the collection of data structures. The meta data may correspond to a cache dynamically updated to indicate invariants which are true for the key in a current state of the collection of data structures. Expensive calculations to search through the collection of data structures for the key may be avoided. For example, costly lookup operations over a collection of data structures (or dictionaries) may not be required at all if a key is known to always (or to never) reference certain specific values, or for these values to have certain meta-properties, in any of the collection of data structure globally throughout a system at a current state.

In another embodiment, a runtime compiler may emit compiled code implementing fast paths (e.g. without load and branch structures) to execute instructions for a source code based on assumptions on meta data associated with keys identified from the source code. The compiled code may include guards, e.g. code for condition checking to enter slow paths, against the fast paths based on the meta data associated with the keys. A runtime state including objects having properties hashed via the keys may be maintained during runtime executing the compiled code. The meta data of the keys may be updated dynamically to reflect changes (e.g. in the objects) of the runtime state. The guards may be executed to perform inexpensive checking operations (e.g. to reference the meta data of the keys without performing expensive lookup over the objects in the runtime state) to update the emitted compile code to include the slow paths when needed during runtime.

In another embodiment, pointer values to typed data in a memory may be modified (or poisoned) with type information (or other property information) to leverage hardware based safety check mechanisms to automatically check the type information against the typed data when performing memory access operations to the typed data via the modified pointer values. Hence, hardware built in logic can be used for a broad class of programming language safety check when executing software codes using modified pointers that are subject to the safety check without executing, for example, compare and branch instructions in the software codes.

In one embodiment, a portion (e.g. high 16 bits in a 64 bit system) of a pointer to an object of a type in a dynamic programming language may be configured (or set) with a type identifier identifying the type. When performing an access to the object via the pointer which is suspected but not known to be of the type, the pointer may be updated with the type identifier (e.g. via an XOR arithmetic operation) to perform the access. If the object is indeed of the type identified by the type identifier, then the access may succeed, otherwise it will cause a hardware trap to automatically activate a trap handler.

In another embodiment, runtime compilation, such as JIT compilation, may generate non-deterministic and unpredictable code to protect against un-trusted code attacks, such as JIT SPRAY attacks, based on heuristic rules without requiring deterministic behavior reduction operations for all the code generated. The heuristic rules may include estimations on, for example, cost (e.g. runtime overhead) of code protection incurred, amount of code protection required and/or other applicable factors and their relationships.

In one embodiment, a figure (or measurement) is dynamically collected or accumulated for estimating how trustworthy a state of a source code is when performing runtime compilation of the source code. The figure may be based on tracking an amount of emitted code (e.g. how many bytes already generated) from the source code and an amount of un-trusted control over the emitted code. For example, the figure may determine (unpredictably) whether to blind (or mangle, randomize) a constant of the source code for the compiled code to defend against potential un-trusted executable code embedded in the constant.

Other features of the present invention will be apparent from the accompanying drawings and from the detailed description that follows.

BRIEF DESCRIPTION OF THE DRAWINGS

The present invention is illustrated by way of example and not limitation in the figures of the accompanying drawings, in which like references indicate similar elements and in which:

FIG. 4 is a flow diagram illustrating one embodiment of a process to trace values randomly during runtime in a tracer graph for optimized compilation;

FIG. 6 is a flow diagram illustrating one embodiment of a process to access hashed values using meta data of hash keys;

FIG. 14 is a flow diagram illustrating one embodiment of a process to emit executable code non-deterministically randomized from a compiled code stream of a source code;

FIGS. 15A-15B illustrate examples of just-in-time compilation with scattered randomization operations according to certain embodiments described herein;

DETAILED DESCRIPTION

Methods and apparatuses for a runtime compiler are described herein. In the following description, numerous specific details are set forth to provide thorough explanation of embodiments of the present invention. It will be apparent, however, to one skilled in the art, that embodiments of the present invention may be practiced without these specific details. In other instances, well-known components, structures, and techniques have not been shown in detail in order not to obscure the understanding of this description.

Reference in the specification to "one embodiment" or "an embodiment" means that a particular feature, structure, or characteristic described in connection with the embodiment can be included in at least one embodiment of the invention. The appearances of the phrase "in one embodiment" in various places in the specification do not necessarily all refer to the same embodiment.

The processes depicted in the figures that follow, are performed by processing logic that comprises hardware (e.g., circuitry, dedicated logic, etc.), software (such as is run on a general-purpose computer system or a dedicated machine), or a combination of both. Although the processes are described below in terms of some sequential operations, it should be appreciated that some of the operations described may be performed in different order. Moreover, some operations may be performed in parallel rather than sequentially.

Figure 1:
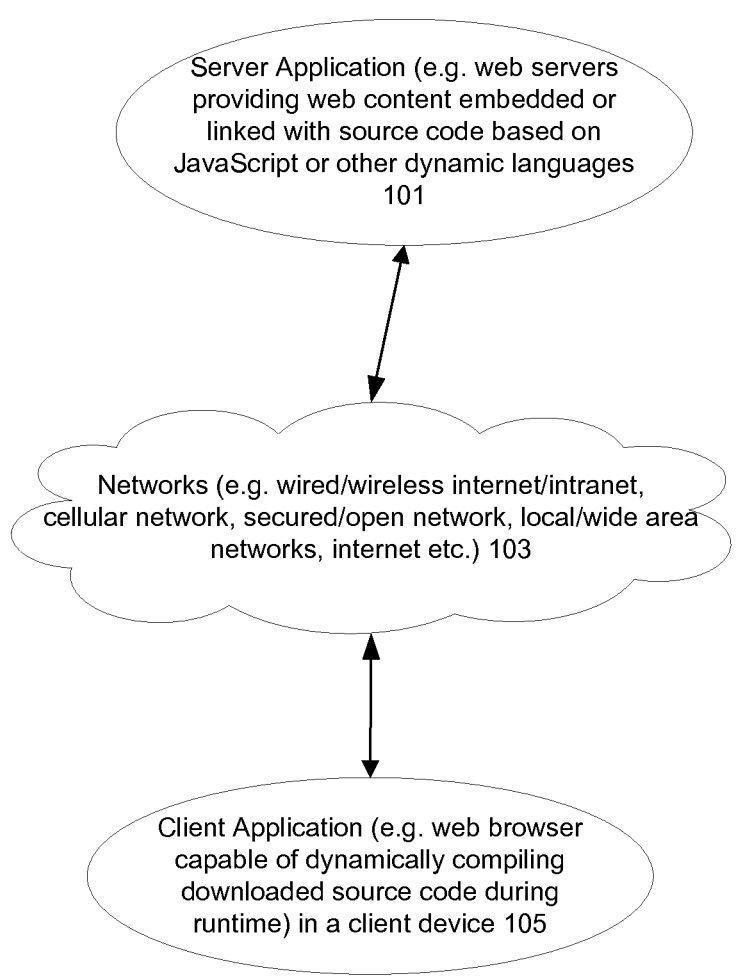
FIG. 1 is a network diagram illustrating an exemplary runtime compilation for source code retrieved from networked devices.

FIG. 1 is a network diagram illustrating an exemplary runtime compilation for source code retrieved from networked devices. In one embodiment, network system 100 may include one or more server application 101, such as web server, hosted in one or more server devices to provide content available for client application 105, such as web browser, running in a client device. Server 101 and client 105 may communicate with each other via network 103 based on, for example, internet protocols such as HTTP (Hypertext Transport Protocol) or other applicable protocols.

In one embodiment, content retrieved from server 101 may include web pages based on hypertext languages, such as HTML (Hypertext Markup Language) or other markup language, embedded or linked (e.g. hyperlinked) with sources in a dynamic programming language, such as JavaScript. Client 105 may dynamically download or fetch the linked sources for execution. In one embodiment, client 105 may dynamically compile the downloaded sources during runtime to improve execution performance.

Figure 2:
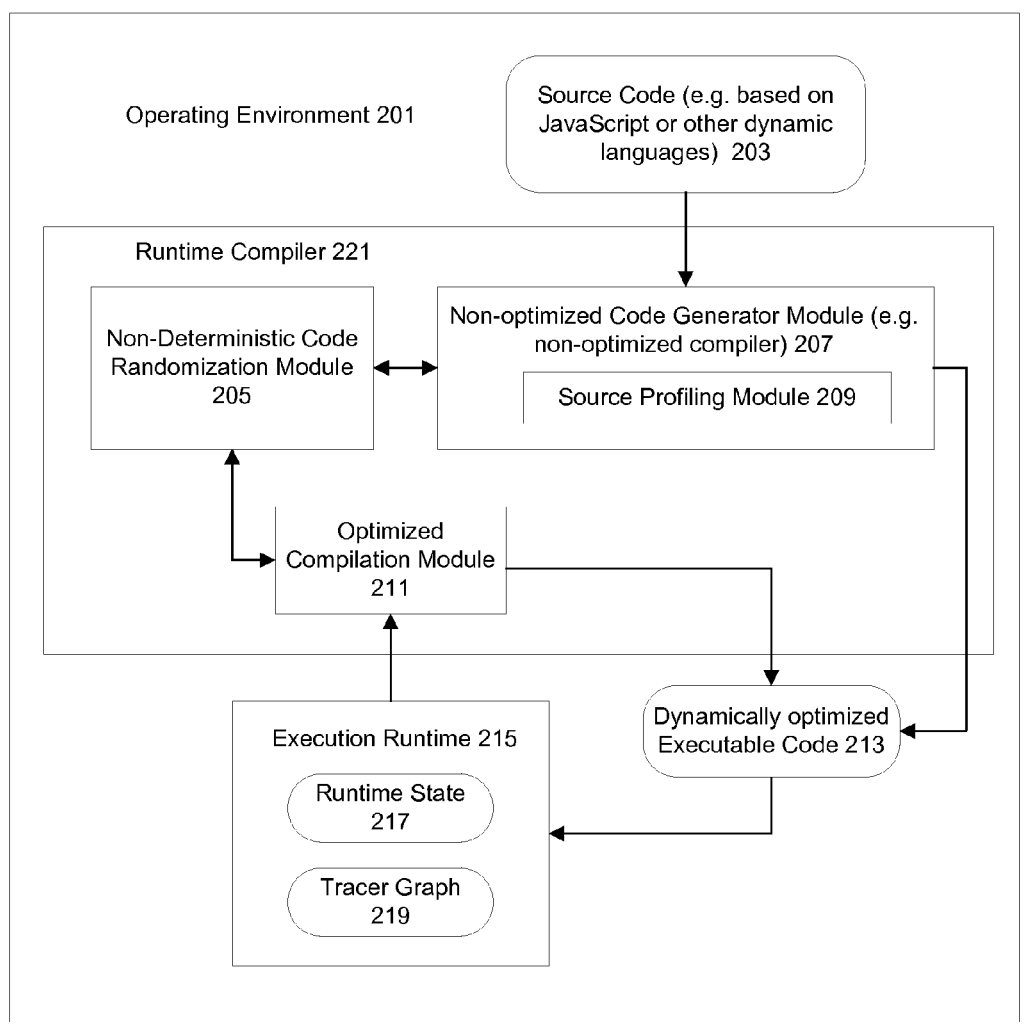
FIG. 2 is a block diagram illustrating one embodiment of a system for runtime compilation of dynamic programming languages.

FIG. 2 is a block diagram illustrating one embodiment of a system for runtime compilation of dynamic programming languages. In one embodiment, system 200 may include operating environment 201, such as an operating system hosting client application 101 of FIG. 1. Operating environment 201 may include runtime compiler 221 dynamically compiling source code 203 into executable code 213. Source code 203 may comprise programs in a dynamic programming language, such as JavaScript. In one embodiment, source code 203 may be retrieved from a remote device, such as server 101 of FIG. 1, by a browser application running in operating environment 201. Both runtime compiler 221 and execution runtime 215 may be controlled by the browser application to perform browsing operations.

In one embodiment, runtime compiler 221 may include non-optimized code generator module 207 to compile source code 203. Module 207 may include source profiling module 209 to generate profiling information (e.g. code location identifiers, token keys, or other statically analyzed code data etc.) from source code 203. According to some embodiments, module 207 may provide an initial version of executable code 213 which is to be dynamically updated and optimized during runtime via optimized compilation module 211.

For example, execution runtime 215 may execute executable code 213 to collect tracer graph 219 which provides runtime statistics for optimized compilation module 211 to perform optimization operations (e.g. data type conversions, code replacements, etc.) on executable code 213. Execution runtime 215 can dynamically maintain runtime state 217 including, for example, data instances (e.g. objects or other data structures) created for executing source code 203. Runtime compiler 221 may include non-deterministic code randomization module 205 to introduce unpredictability between source code 203 and executable code 213 to protect against executing potential hidden executable code embedded inside source code 203.

Dynamic Tracer Based Runtime Optimization

In one embodiment, trace code may be introduced (or injected, planted) into compiled code of a source code during, for example, profiling phase when compiling the source code. The trace code, when executed during runtime executing the compiled code (e.g. non-optimized code) may randomly and sporadically generate tracer data to provide information exposing opportunities to optimize the compiled code. Optimization operations, such as type conversions or other applicable compilation operations, may be dynamically applied to optimize portions of the compiled code during runtime by leveraging the information obtained from executing the trace code. The optimized compiled code (instead of the non-optimized compiled code) may be executed dynamically to speed up, for example, certain selected portions of the source code, such as repeated function calls or loops, with limited processing or resource cost incurred by the trace code.

For example, trace code may be executed to create tracer data to represent a value used during runtime of compiled code. The tracer data for a value may be structured to include (or box) the value and additional code information of the value, such as an origin or provenance of the value (e.g. source file name, line number, or other information indicating where in the compiled code or source code the value is created or originated from, such as the location of the machine code generated for the value). In one embodiment, the tracer data may be tagged or identified with a special type to distinguish from existing data types (e.g. strings, integer, etc.), objects or other dynamic types employed in a programming language (e.g. JavaScript) of the source code. Thus, during runtime, access to the tracer data may be recognized (e.g. directly from a pointer tagged with the special type) to perform operations to access its corresponding value.

In one embodiment, tracer code may be inserted at trigger points (e.g. instructions to access or store a value in a memory) in a compiled code. The tracer code may include a random evaluator to determine, when executed, whether to generate a tracer data (e.g. tracer bullet) to box (or carry, wrap) the value with additional code information of the value, for example, available from the profiling phase of corresponding source code. Tracer data may be created when a value is stored in memory, put into a stack or passed to a function call etc. In one embodiment, the random evaluator may be configured to generate tracer data sporadically among the compiled code with low probability (e.g. less than 1%). As a result, the overhead to extract (or un-box) the corresponding value from the tracer data when encountered during runtime can be reduced. In certain embodiments, the random evaluator may be based on a global counter which returns true if it counts over a configured number (e.g. 100) and returns false otherwise to guide the generation of tracer data with low probability of being evaluated to be true.

In certain embodiments, tracer data may be generated to allow collection of runtime data flow information on the fly without conducting expensive analysis over a source code (or whole program). A probability data flow graph may be dynamically constructed to represent the runtime data flow information. Code information, such as origins of values, may be recorded in tracer data to be readily available when the tracer data is accessed during runtime without a need to repetitively scan (or read) the source code to search for the code information for collecting the runtime data.

In one embodiment, as a tracer data is created for a value in a compiled code, existing links to the value (e.g. to access the value) in the compiled code may be updated with a reference (or pointer) to the tracer data. The reference to the tracer data may include a special tag to allow invoking of a special handler to unwrap the value from the tracer data based on the special tag identified from the updated links encountered when the compiled code is being executed. Additionally or optionally, a garbage collector routine may recognize tracer data (e.g. based on the special tag) allocated in a memory to remove the tracer data at each memory clean up session to ensure minimal memory usage impact from the tracer data.

During runtime of a non-optimized compiled code instrumented or injected with tracer code, a data flow graph may be maintained to gather information via dynamically created tracer data on how values are created, consumed or used, etc. with relative frequencies of occurrences. For example, a first node in the graph may be associated with a value created as an integer constant. The first node may be related to a code location where the value is created (or stored) as instructed in a program. A tracer data may be stored in memory during runtime to represent the value in combination with information indicating the code location where the value originates.

When the value is referenced for consumption (e.g. when passed to a function to be used as operands in an arithmetic operation or other applicable operations) at a destination location of the program, the tracer data may be accessed from memory to deference the value embedded within. A second node for the value may be updated in the graph to represent the destination location where the value is used. The graph may include a directed edge for the value from the first node to the second node.

In one embodiment, each node of a data flow graph may be associated with information related to a value, such as a type of data when the value is created, the type of data when the value is used (or converted to when used), code location corresponding to the node, number of times instructions in this code location are executed (e.g. recorded based on a counter), or other applicable information. Each edge in the data flow graph may include a source node and a destination node for a value. The edge may include a number dynamically updated (e.g. based on a counter) during runtime to indicate a frequency, a weight or a cumulative number of times the value has been encountered (or traced) to be passed from a code location associated with the source node to another code location associated with the destination node. Thus, the data flow graph may carry runtime execution traces to allow inference on how a value of a program is used during runtime without stopping the program.

Compiled code may be optimized based on runtime data collected in a data flow graph. For example, a source code may specify allocating a type of value (e.g. integer value) at a code location (or code block) corresponding to a node in the data flow graph. An optimized compiler may analyze the data flow graph to identify how this value is to be used during runtime, for example, based on edges originating from the node (e.g. outgoing edges) in the graph. Each edge may be directed from the node as a source node towards a destination note. Additionally, the edge may indicate how many times the value has been used as a particular type (e.g. string, double, integer, or other applicable types) according to the destination node.

In one embodiment, probability or likelihood for using a value as a particular type of data may be evaluated based on a data flow graph. Directed edges from a source node corresponding to a code location for creating the value may provide runtime execution records gathered in earlier runs as heuristics to estimate how the value will be used. Destination nodes associated with the directed edges may indicate which types the value have been used. In anticipating potential type conversions to be performed during runtime, the compiled code for the value at the code location may be optimized to pre-convert the value to an inferred type of data to reduce type conversion operations or other runtime resource usage. The inferred type may be a particular type observed most often or with highest probability in the destination nodes for using the value.

In one embodiment, execution of non-optimized compile code may be dynamically monitored to determine when to perform compiler optimization on which portions of the compiled code. For example, if a function has been called or a loop code has been executed more than a threshold number of times (e.g. 66 function calls, 1000 loops or other statically or dynamically configured number of times), compiler optimization may be invoked during runtime to optimize corresponding code. Alternatively, compiler optimization may not be performed on a portion of the compiled code if the runtime monitoring indicates a low rate of usage (or execution) for the portion of code. The low rate of usage may be based on a predetermined usage threshold (e.g. the observation that a function is only called once) or relative resource usage comparison with other portions of the compiled code during the period of time monitored.

Figure 3:
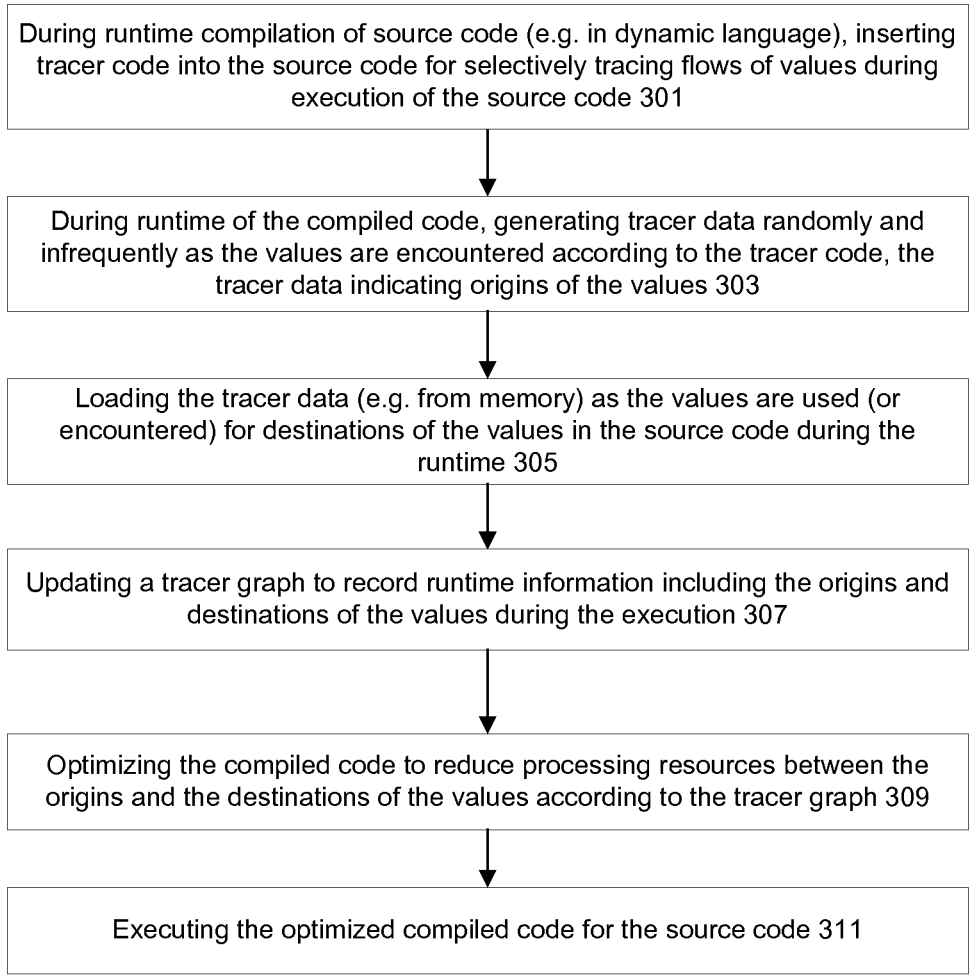
FIG. 3 is a flow diagram illustrating one embodiment of a process for optimized runtime compilation using tracer data (or tracer bullets)

FIG. 3 is a flow diagram illustrating one embodiment of a process for optimized runtime compilation using tracer data. Exemplary process 300 may be performed by a processing logic that may include hardware (circuitry, dedicated logic, etc.), software (such as is run on a dedicated machine), or a combination of both. For example, process 300 may be performed by some components of system 200 of FIG. 2. At block 301, according to one embodiment, the processing logic of process 300 may insert tracer code to a source code during runtime compilation of the source code. For example, the processing logic of process 300 may retrieve the source code from a remote device (or a local storage) to dynamically execute executable code compiled from the source code. Alternatively, the source code may be executed via an interpreter mechanism without a need for compilation but carrying certain performance overhead.

In one embodiment, a source code may be based on a dynamic programming language, such as JavaScript, without explicit specifications of data types for values created in the source code. The processing logic of process 300 may add tracer code to code blocks referencing the values in the source code to enable selectively tracing flows of the values during execution of the source code.

At block 303, during runtime of a compiled code (e.g. not optimized) of a source code, the processing logic of process 300 may generate tracer data randomly and infrequently (e.g. less than 1%) for values encountered (e.g. when values are stored in memory) according to tracer code inserted in the source code. The values and origins (e.g. original code locations) of the values may be wrapped inside the tracer data.

At block 305, when values are used (or encountered) at destination code locations during runtime of the source code (e.g. based on non optimized compiled code), the processing logic of process 300 may load tracer data (e.g. from memory) to access the values from the tracer data. The tracer data loaded may indicate the origins of the corresponding values. In one embodiment, the processing logic of process 300 may update a tracer graph to record runtime information according to the tracer data loaded. The runtime information may include the origins of the values indicated in the tracer data and destinations of the values used during the execution.

The processing logic of process 300 may optimize a compiled code at block 309 to reduce processing resources between origins and destinations of values tracked in a tracer graph. For example, the processing logic of process 300 may convert a value at its original code location with a data type mostly used in destination (or sink) code locations tracked in the tracer graph In some embodiments, the processing logic of process 300 may monitor runtime status of a non-optimized compiled code to selectively optimize portions of code. For example, a code block corresponding to an infrequently executed function may not need to be optimized. At block 311, the processing logic may execute the optimized compiled code, and optionally, portions of the compiled code which are not optimized.

FIG. 4 is a flow diagram illustrating one embodiment of a process to trace values randomly during runtime in a tracer graph for optimized compilation. Exemplary process 400 may be performed by a processing logic that may include hardware, software or a combination of both. For example, process 400 may be performed by some components of system 200 of FIG. 2. At block 401, the processing logic of process 400 may randomly and infrequently determine whether to trace a value V specified in a source code, for example, to be stored in memory based on a store or assignment operation. Value V may be associated with an origin O (e.g. line number) indicating where value V is created in the source code. In one embodiment, whether to trace value V may be decided based on counting a global counter and whether the counted global counter overflows a certain configured number (e.g. 100). Value V may be traced if the overflow occurs with the global counter reset back to its initial value (e.g. 0).

At block 403, if value V is determined to be traced, the processing logic of process 400 may allocate tracer data in a memory to store value V and origin O according to a tracer data type (or bullet tracer type). For example, the tracer type may specify a data structure having two 64 bit words. The tracer data may be pointed to by a pointer having a tag indicating the tracer data (e.g. the traceable bullet type). The processing logic of process 400 may recognize a pointer to tracer data directly from the pointer itself.

At block 405, the processing logic of process 400 may access value V via a pointer for a destination D located in a code where value V is used (or consumed). For example, destination D may indicate a code location inside a function passed with value V. At block 407, the processing logic of process 400 may determine whether the pointer points to tracer data, for example, according to a tag indicating the traceable bullet type.

At block 407, if the pointer points to tracer data, the processing logic of process 400 may access value V and origin O (e.g. 8 bytes offset from where value V is stored) from the tracer data. In one embodiment, accessing (or retrieving) value V via the tracer data may be based code execution following a slow path of code. Alternatively, accessing value V without the tracer data (e.g. via a pointer pointing to value V in memory) may be based on code execution following a fast path of code which may require less operations than the slow path.

In one embodiment, at block 411, if a tracer graph G (e.g. a data structure representing a directed graph based relationships) includes an edge E directed from origin O to destination D (e.g. separate nodes of graph G), the processing logic of process 400 may update a weight of edge E (e.g. by one). A weight of an edge in graph G may represent number of occurrences (or other collected statistics) of value flow from origin O to destination D during runtime. Otherwise, if edge E is currently not present in graph G, the processing logic of process 400 may update graph G with edge E having an initial weight (e.g. 1). Subsequently at block 415, the processing logic of process 400 may load value V from the tracer data to be used for code located in destination D.

Figure 5:
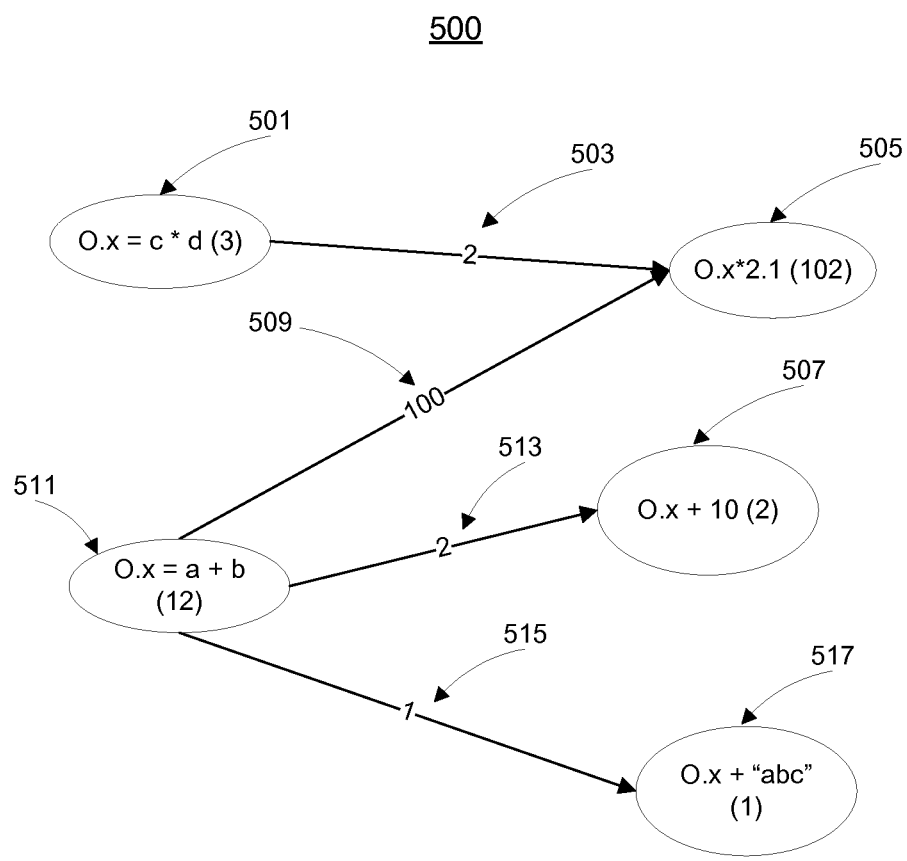
FIG. 5 is a graph diagram illustrating an exemplary tracer graph to trace values during runtime.

FIG. 5 is a graph diagram illustrating an exemplary tracer graph to trace values during runtime. For example, node 511 may indicate 12 observations (or 12 records have been traced) on generation of value O.x=a+b during runtime for monitored execution. Edge 509 may include a number 100 representing number of times (e.g. based on looping code execution) the value created at node 511 has been used at code location corresponding to node 505. In one embodiment, node 505 may indicate code O.x*2.1 has been executed 102 times using values created at node 511 and node 501. Edge 503 may indicate node 505 consumes 2 values created at node 501. Node 501 may indicate 3 values have been traced to be created via O.x=c*d.

In one embodiment, node 505, node 507 and node 517 may include code information indicating different types used for value O.x, such as type double, integer and string respectively. Edges 509, 513, and 515 may provide collected numbers (or statistics) indicating number of times value O.x created at node 511 have been be used (e.g. as traced), such as, 100 times as type double, 2 times as double integer and once as time string. As a result, an optimized compiler may update compiled code at code location (or block) corresponding to node 511 to pre-convert value O.x to type double such that potential conversion operations to double for code located for node 505 may be avoided.

Runtime Optimization Using Meta Data

In one embodiment, expensive lookup operations to search for object properties associated with keys may be avoided by maintaining meta data for the keys. Each key may be represented as a string, a sequence of characters or other applicable unit of data. During runtime executing code based on dynamic programming languages (e.g. JavaScript), a class of dictionaries may be employed to store properties for allocated data, such as objects. Exemplary entries in an object's property storage may include meta-attributes, such as "is-read-only", "is-accessor", or other applicable attributes, and associated attribute values, for example, indicating whether corresponding attributes are true or not.

Exemplary runtime calculations or operations for a given dictionary/key pair may be performed to determine whether a dictionary contains a read only value referenced by a key. Such calculation or search operations may not be needed by recording certain important invariants directly with a key object representing the key. For example, a key related data or object may be created to contain a piece of data, e.g. "read-only" key meta data, tracking whether any existing dictionary contain read-only properties or values associated with (or indexed by) the key in a current runtime state. These invariants of the key may be checked whenever such calculation is to be performed during runtime.

In some embodiments, a mechanism may be provided to determine whether a block of optimized code which relies on invariants or meta data associated with keys (or key specific invariants) are still valid. Whenever these invariants change, the corresponding block of optimized code may be invalidated. For example, a runtime compiled code (e.g. via JIT compiler) may be based on validity of an invariant that a given key will never reference a property with the 'is-accessor' meta-attribute. Should the state of this invariant change (i.e. a property with the 'is-accessor' meta attribute is added to a dictionary entry referenced by the given key) during runtime, the runtime compiled code that relies on this invariant would have to be invalidated, removed or replaced so that it is no longer used.

A runtime state (e.g. at a point in time) for executing a dynamic language based code may include a universe of objects with key indexed (or associated) properties, such as dictionaries, hash tables or other applicable associative data structures. Additionally, the runtime state may include a collection of keys and key specific meta data (or invariants). A key may be identified from the code (e.g. source code), for example, during a profile stage of a runtime compilation. Alternatively, a key may be dynamically created during runtime (e.g. via execution of key=input( )). Key meta data be created or maintained to explicitly describe "facts" or assertions on certain aspects of the keys related globally to the current runtime state (e.g. all existing objects or data instances).

In one embodiment, key meta data may indicate a global assertion which can be verified to be true via search operations on existing objects with respect to a key associated with the meta data. For example, a runtime state may include a particular key not used (or included) in any currently existing objects. The key specific meta data may include an entry for the particular key indicating that this particular key is not currently used in any objects. Result of search operations through all currently existing objects of the runtime state (or universe) for properties indexed by the particular key may be consistent with the key specific meta data. Such search operations may be avoided with the availability of the key specific meta data.

Key specific meta data for a runtime state executing a dynamic programming language based code may indicate whether a key is used (by any existing object) in the runtime state, whether a property indexed by a key in the runtime state has a "read-only" attribute, whether a function call is associated with the key (e.g. statically), and/or other applicable global information related to the key. In one embodiment, key specific meta data may comprise multi bit data requiring low memory resource overhead. Each bit may have a binary value indicating whether a statement or assertion associated with the bit about the corresponding key is globally true with respect to the current runtime state.

Runtime compiled code for a dynamic language (e.g. Java-Script) based program may include a code block to access key specific meta data (or invariant data) and guard itself from potentially lengthy and expensive lookup operations when, for example, accessing a dynamically assigned property (e.g. v=o.m). A key meta data access function may be called in the code block to determine whether a key corresponding to the property (e.g. m) is used or not. If the property is not used, slow path code to search all existing objects (or dictionaries) of the runtime may be skipped.

Key meta data of a runtime state may be dynamically updated to synchronize with changes of the runtime. For example, once (or at the same time) an object property associated with a particular key is created (or added to a dictionary), the key meta data for the particular key may be modified (e.g. by flipping a bit value) to reflect that this particular key is used in at least one object in the runtime state.

In one embodiment, a runtime compiler may generate optimized compiled code for a source code based on initially established key invariants (or key specific meta data) having initial values consistent with an initial runtime state for executing the source code. For example, the runtime compiler may generate optimized code for each access of property "m" (e.g. o.m=x) in the source code to assign property "m" (or to update a dynamic type for an object) without performing safe guard operations to search for property "m" (or corresponding key) among existing objects in the runtime state at the time of execution.

During runtime, a runtime compiler may dynamically update the optimized compiled code as key invariants are modified because of changes which may have occurred during the runtime state. As a result, portions of optimized compile code based on certain assumptions (e.g. initial values) on key invariants may be invalidated if such assumptions are not longer true. For example, if property "m" is assigned to an existing object during runtime, each block of optimized code for the access of property "m" in the compiled code may be updated, for example, to execute a separate code path to guarantee soundness with additional operations (e.g. search or lookup operations). In certain embodiments, the optimized compiled code may include indicators (e.g. based flags in a table data structure) indicating a code block is optimized.

FIG. 6 is a flow diagram illustrating one embodiment of a process to access hashed values using meta data of hash keys. Exemplary process 600 may be performed by a processing logic that may include hardware, software or a combination of both. For example, process 600 may be performed by some components of system 200 of FIG. 2. At block 601, the processing logic of process 600 may inspect key meta data for a key to determine whether to perform lookup operations in response to accessing a property indexed by the key for a target data object during runtime executing a code.

In one embodiment, a runtime state may comprise currently (e.g. at a point in time during runtime) allocated data objects, for example, including a target data object. Access a property indexed by a key for the target data object may cause allocation of a new property indexed by the key. Lookup (or search) operations may be required to determine whether any existing property of the currently allocated data objects related to the target data object is indexed by the key. Key meta data of the key may include descriptions of invariants which are globally true for the key among the currently allocated data objects. For example, one of the invariants of the key may indicate whether the key is used to index existing properties in the currently allocated data.

At block 603, the processing logic of process 600 may perform accessing operations for a property indexed by a key directly on a target data object without performing lookup operations on currently allocated data objects in a runtime state if invariants or meta data of the key satisfy certain conditions. For example, a condition may be a requirement that a key is not currently used or referenced in any one of existing data objects in a runtime state. If the condition is satisfied for the key, for example, there is no need to perform potentially expensive lookup operations among multiple data objects to locate a property indexed by the key.

In one embodiment, property access operations may result in changes in a runtime state. For example, the property access operations may result in an object updated with a newly added or assigned property indexed by a key which has not previously been used in any existing objects. At block 605, the processing logic of process 600 may update the key meta data for the key to maintain consistency between the invariants of the key and the runtime state updated (or changed) by the access operations.

Figure 7:
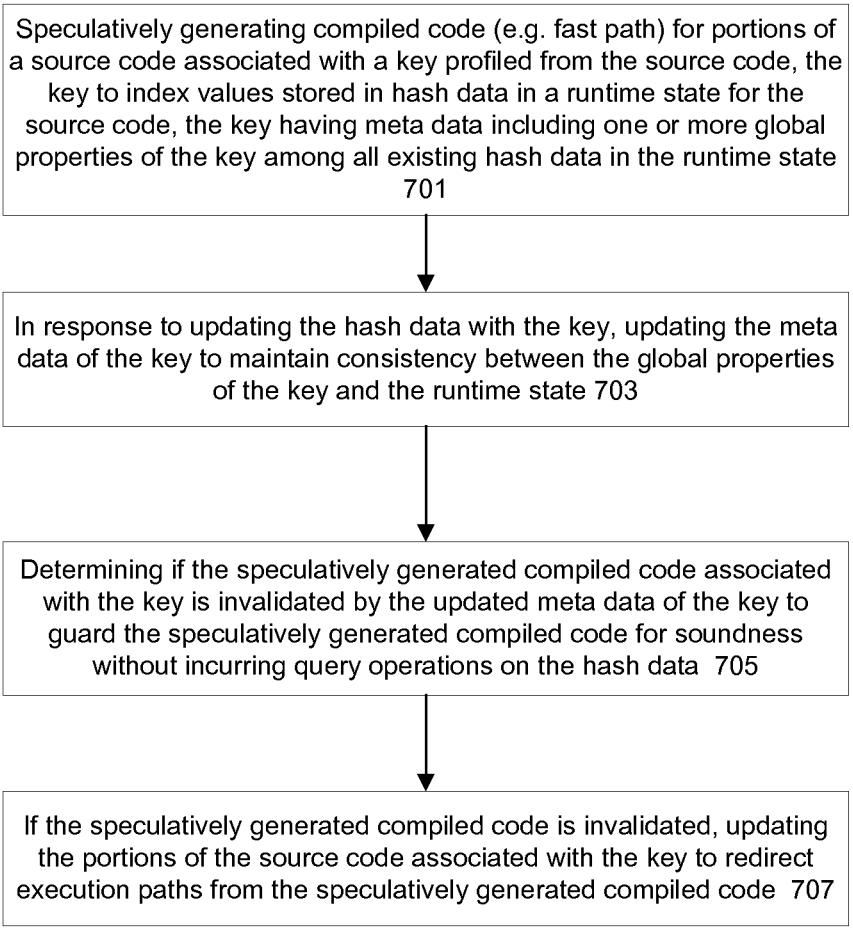
FIG. 7 is a flow diagram illustrating one embodiment of a process to dynamically update speculatively generated compiled code using meta data of hash keys without querying hash data for the hash keys.

FIG. 7 is a flow diagram illustrating one embodiment of a process to dynamically update speculatively generated compiled code using meta data of hash keys without querying hash data for the hash keys. Exemplary process 700 may be performed by a processing logic that may include hardware, software or a combination of both. For example, process 700 may be performed by some components of system 200 of FIG. 2. At block 701, the processing logic of process 700 may speculatively generate compiled code (e.g. fast path without performing lookup operations) for portions of a source code associated with a key profiled from the source code. The key may index values stored in hash data, such as dictionaries representing objects or other key associative data structures, in a runtime state for the source code. Meta data associated with the key may be maintained with one or more global properties of the key among all existing hash data in the runtime state.

At block 703, the processing logic of process 700 may update meta data of a key in response to updating hash data of a runtime state with the key to ensure that global properties described in the meta data of the key are consistent with a current runtime state including changes of the updated hash data. For example, the updated hash data may include a new property indexed by the key in an object data and the updated meta data of the key may indicate that a global property describing that the key is not used in any existing object data is no longer valid.

At block 705, the processing logic of process 700 may determine if speculatively generated compiled code associated with a key is invalidated by updated meta data of the key to guard the speculatively generated compiled code for soundness without incurring query operations on hash data of a runtime state. The speculatively generated compiled code may be emitted based on assumptions that certain conditions of the meta data of the key are true or satisfied. If these conditions are no longer valid as in the updated meta data of the key, the speculatively generated compiled code may need to be invalidated.

If the speculatively generated compiled code is invalidated, at block 707, the processing logic of process 700 may update portions of a source code associated with a key to redirect execution paths from the speculatively generated compiled code. For example, instead of executing a fast path according to the speculatively generated compiled code, the processing logic of process 700 may proceed to execute a slow path of code including operations such as lookup, search, or query operations among existing hash data for values or properties indexed by the key.

Figure 8:
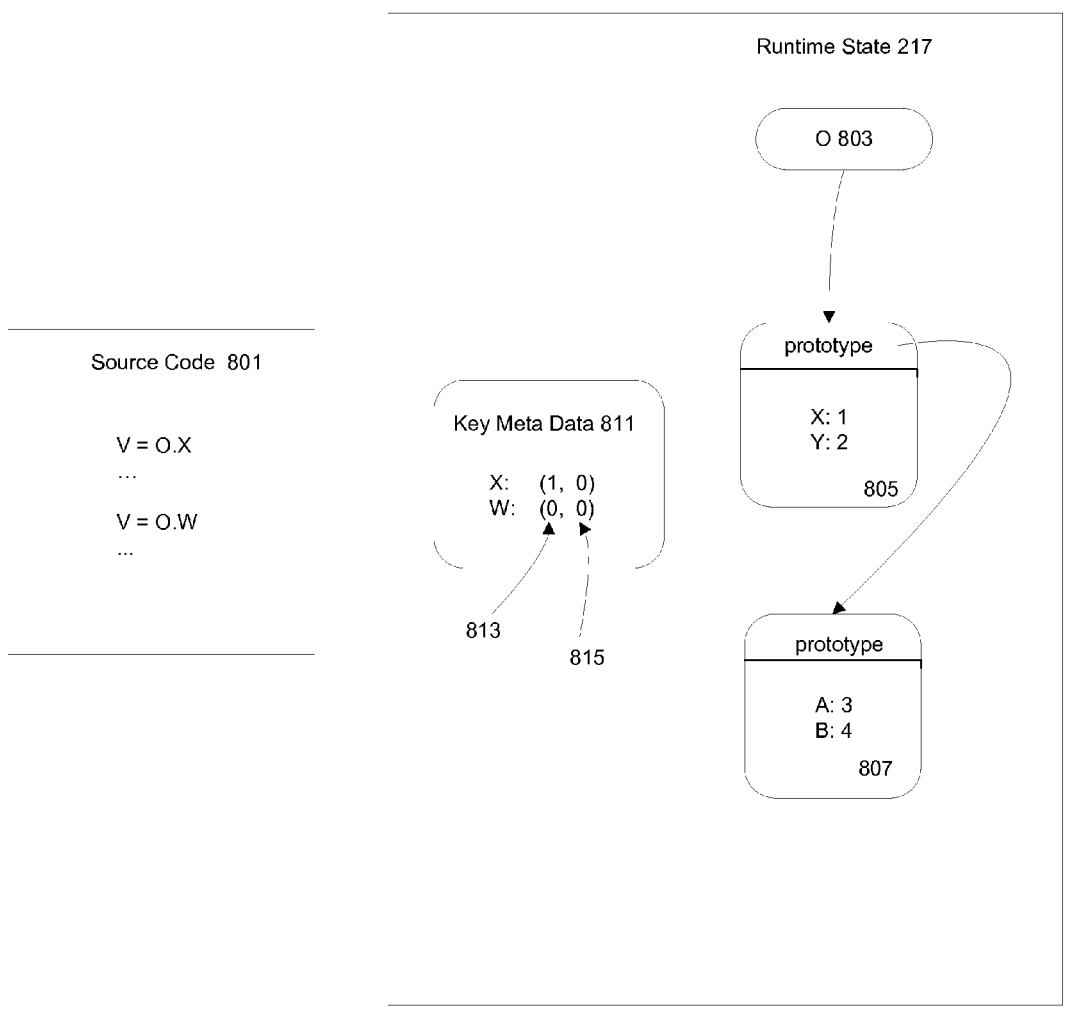
FIG. 8 illustrates exemplary key meta data for a runtime according to one embodiment described herein.

FIG. 8 illustrates exemplary key meta data for a runtime according to one embodiment described herein. Example 800 may be based on some components of system 200 of FIG. 2. In one embodiment, runtime state 217 may represent a runtime executing code compiled from source code 801. Object 805, 807 may have already been allocated in runtime state 217 at a certain point in time during the execution of source code 801, for example, when executing code block V=O.W of source code 801 to access property W of O 803 pointing to object 805.

Key meta data 811 may be maintained in runtime state 217 describing global invariants or meta data of keys X, W among all objects currently exist in runtime state 217. For example, meta data of a key may be represented as multi-bit (e.g. 2 bit) values indicating whether the key is used in any existing objects and whether the key is associated with a "read-only" property. Bit 813 may indicate that key W is not used in any currently existing object of runtime state 217. Bit 815 may indicate that key W is not associated with a "read-only" property. Bit 813 may be updated to be 1 if V=O.W is executed with allocation of property W in object 805.

Automatic Type Checking Via Poisoned Pointers

In one embodiment, property accesses (e.g. "o.x", where o refers to an object and x refers to a property of object x) in dynamic languages like JavaScript may be optimized according to a single load from memory. Certain operations, such as compare operation, a branch operation and one memory load operation, may not be needed for the property accesses to improve performance in runtime optimization techniques, such as inline caching. Optionally, optimization opportunities leveraging special processor architectures, such as pipeline processors or multi-processors, to execute code may increase (e.g. vie predictive execution of code paths) with less compare and branch operations present in the code.

In certain embodiments, property access may be specified (or asserted) to be executed only on objects of a particular (or expected) type. Different property accesses may be specified with different expected types. A pointer to address a property in memory may be limited to a maximum number of allowed addresses (e.g. $2^{48}$) less than number of possible addresses representable by the pointer (e.g. $2^{64}$ in a 64 bit value based processing system). Extra space (e.g. upper 16 bits) in the pointer may be specified with the expected type (e.g. among up to $2^{16}$ possible number of types) for the data addressed by the pointer. The pointer may be loaded to a hardware register to access the memory atomically for a unit of data (e.g. 64 bit in size) addressed by the pointer.

A pointer asserting a type may be processed before accessing addressed data (e.g. loading to a hardware register) in memory to ensure automatic type checking. A processing system may automatically check whether a memory address pointed by a pointer satisfy certain conditions (e.g. upper 16 bits must be zero) without requiring executing additional machine instructions (e.g. for compare operations, branch operations, etc.). If the conditions are not satisfied, the processing system may automatically invoke (e.g. without being instructed by executable code) a trap handler which can be preregistered with intended instructions. In one embodiment, the pointer asserting the type may be processed with an expected data type to fetch the data of the expected type or to execute the trap handler perform necessary compensating actions if the data is not of the expected type.

In one embodiment, a pointer to a property storage of an object (e.g. structured data) may include (or embed) a type identifier of the object (e.g. in the upper 16 bits) and the memory address of the property storage. The pointer may be type embedded to assert a type of data addressed via the embedded type identifier. In one embodiment, a type may be dynamically ascribed or assigned for a given combination and ordering of properties that an object may have. Thus, for example, every object with properties {x,y,z} (e.g. ordered properties identified by x, y and z) may have the same type, but that type will be different from objects that have properties {x,y} or even {z,y,x}. A type (e.g. {x,y}) may specify an offset (e.g. 8) of a property data (e.g. y) within a property storage of the type.

In some embodiments, an optimized inline cache mechanism may include automatic type checking via type embedded pointers. For example, a known type may specify an offset O for the property data within a property storage for the known type. To access a property data of an object expected to be of the known type, the optimized inline cache mechanism may be performed with a type embedded pointer P to the property storage of the object via only two load operations and one arithmetic operation. In one embodiment, the fact that the hardware already tests a portion (e.g. the upper 16 bits) of a pointer during a heap access may be leveraged in the optimized inline cache mechanism.

For example, optimized operations to access the property data from the property storage of the object may be performed as 1. loading the property storage pointer P from the object; 2. subtracting $E*2^{48}$ from P, where E is an identifier identifying the expected type; and 3. loading from P+O. If E matches the type of the object, then the access to P+O will succeed, since subtracting $E*2^{48}$ from P will result in P's upper bits being zero. But if E does not match the type of the object, then $P-E*2^{48}$ will result in a value that is greater than $2^{48}$, and the access to P+O will result in a hardware trap. A trap handler may be registered to divert execution to a slow path code for the property access, which may either fix the inline cached data or perform a full look-up. Thus, an inline cache mechanism may be optimized via the optimized operation to access property data without executing code to perform expensive compare-and-branch operations (e.g. to determine if the object is of a type matching the known type).

In one embodiment, type embedded pointers may allow simultaneous checks for a large number of dynamically create data types (e.g. up to $2^{16}$ types). Additionally, an original value (e.g. memory address) of a type embedded pointer may be recovered any time via simple arithmetic operations (e.g. by either clearing the upper 16 bits or subtracting a corresponding type identifier). A memory access via an address recovered from a type embedded pointer via subtraction operation with a type identifier may not succeed if the type identifier does not match the type embedded in the pointer.

Figure 9:
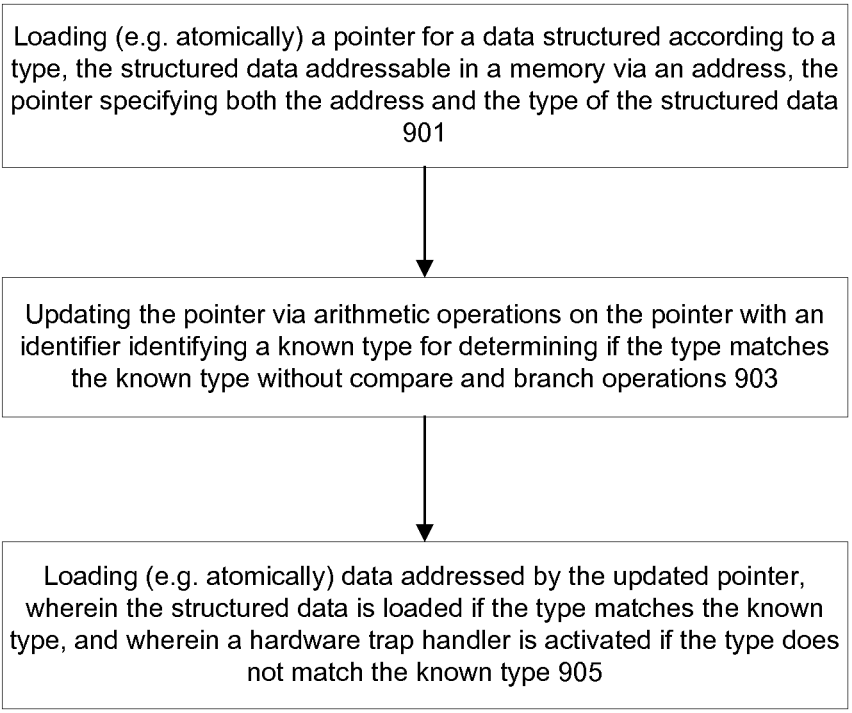
FIG. 9 is a flow diagram illustrating one embodiment of a process to access a data of a certain type without compare and branch operations.

FIG. 9 is a flow diagram illustrating one embodiment of a process to access data of a certain type without compare and branch operations. Exemplary process 900 may be performed by a processing logic that may include hardware, software or a combination of both. For example, process 900 may be performed by some components of system 200 of FIG. 2. At block 901, the processing logic of process 900 may load (e.g. atomically without interruption) a pointer for data structured according to a type. For example, the type may be dynamically created/assigned specifying how data elements should be allocated or structured for data of the type. The structured data may be addressable in a memory via an address. The pointer may include both the address and the type of the structured data.

At block 903, the processing logic of process 900 may update a pointer via arithmetic operations performed on the value of the pointer and an identifier identifying a known type. The pointer may be updated for determining if data pointed (or addressed) by the pointer (e.g. via a memory address specified in the pointer) is of the known type without performing compare and branch operations.

At block 905, the processing logic of process 900 may load (e.g. atomically) data pointed by an updated pointer, e.g. via a hardware address register holding the update pointer to address the data. If the data is structured with a type matches a known type, the data may be successfully loaded (or retrieved). Otherwise, in one embodiment, a hardware trap handler may be activated. For example, the updated pointer may become invalid (or point to an illegal memory address) if the data pointed by a memory address of the pointer is not of the known type. In one embodiment, hardware built-in logic may automatically detect an illegal memory address when instructed to load data (via the hardware address register). A hardware trap may be issued to direct execution to the trap handler when an illegal memory address is detected.

Figure 10:
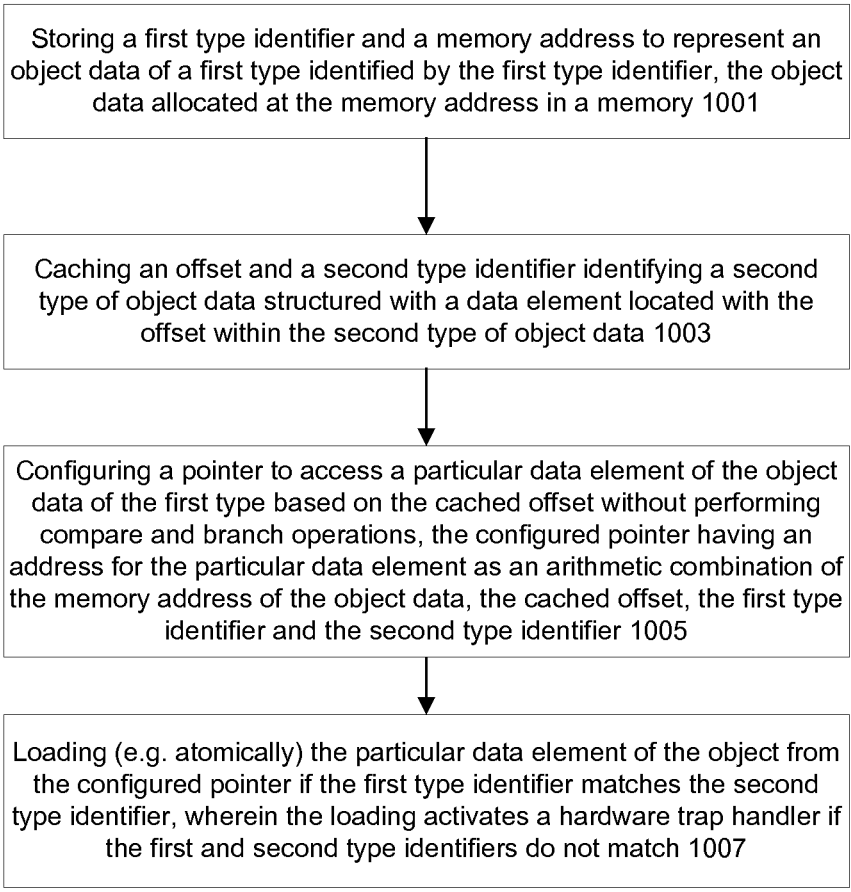
FIG. 10 is a flow diagram illustrating one embodiment of a process for accessing a data element of an object according to a cached type without performing compare and branch operations.

FIG. 10 is a flow diagram illustrating one embodiment of a process for accessing a data element of an object according to a cached type without performing compare and branch operations. Exemplary process 1000 may be performed by a processing logic that may include hardware, software or a combination of both. For example, process 1000 may be performed by some components of system 200 of FIG. 2. At block 1001, for example, the processing logic of process 1000 may store a first type identifier and a memory address to represent an object data of a first type identified by the first type identifier. The object data may be allocated at the memory address in a memory.

At block 1003, the processing logic of process 1000 may cache an offset and a second type identifier identifying a second type of object data structured with a data element located with the offset within the second type of data. The data element may correspond to a dynamically allocate property for the second type of data. In one embodiment, the processing logic of process 1000 may have previously performed an access operation for a data element via the offset in a data of the second type.

At block 1005, the processing logic of process 1000 may configure a pointer to access a particular data element of an object data of a first type based on an cached offset without performing compare and branch operations. The configured pointer may have an address value as an arithmetic combination of the memory address of the object data, the cached offset, a first type identifier identifying the first type and a cached type identifier identifying a second type of data.

At block 1007, in one embodiment, the processing logic of process 1000 may perform a load operation to access a particular data element of an object data from a configured pointer. The particular data element may be successfully loaded if a first type identifier identifying a first type of the data object matches a second type identifier which is cached. Alternatively, the load operation may activate a hardware trap handler if the first and second type identifiers do not match.

Figure 11:
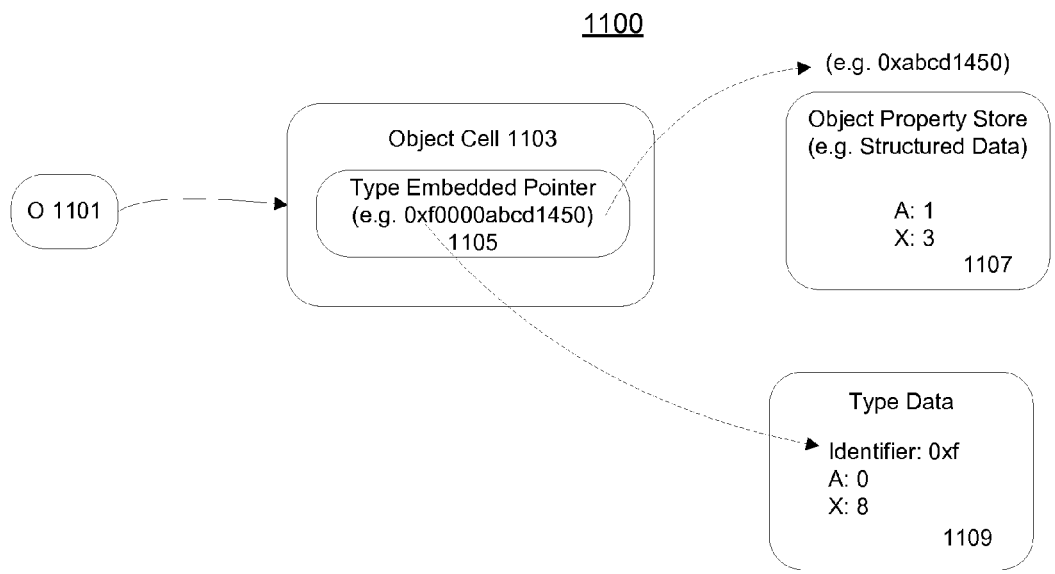
FIG. 11 illustrates one example of a type embedded pointer to represent an object according to embodiments described herein.

FIG. 11 illustrates one example of a type embedded pointer to represent an object according to embodiments described herein. Example 1100 may include an object pointer O 1101 pointing to object cell 1103 to represent an object. Object cell 1103 may include type embedded pointer 1105 configured (e.g. via lower 48 bits) with an address of object property store 1107 allocated for storing properties for object O. Additionally, type embedded pointer 1105 may be tagged (e.g. via upper 16 bits) with an identifier identifying type data 1109. In some embodiments, type data 1109 may be dynamically created to specify a data structure identified by the type identifier.

In one embodiment, known type 1111 may by a type identifier identifying a cached type or an existing type of data (e.g. during runtime). A type identifier may be represented by, for example, lower 16 bits of a 64-bit word (e.g. in 64-bit based machine) capable of representing $2^{16}$ different types of data. Configured pointer 1113 may be used to access property store 1107 for object O and verify if the type identifier embedded in type embedded pointer of object O matches known type 1111. For example, configured pointer 1113 may be derived via arithmetic operations on type embedded pointer 1101 and known type 1113. A hardware based mechanism may automatically check validity of configured pointer 1113 based on, for example, whether the upper 16 bits are of value 0, NULL or other predetermined values, etc. An invalid address may be configured in configured pointer 1113 if known type 1111 does not match identifier for type data 1109.

Figure 12:
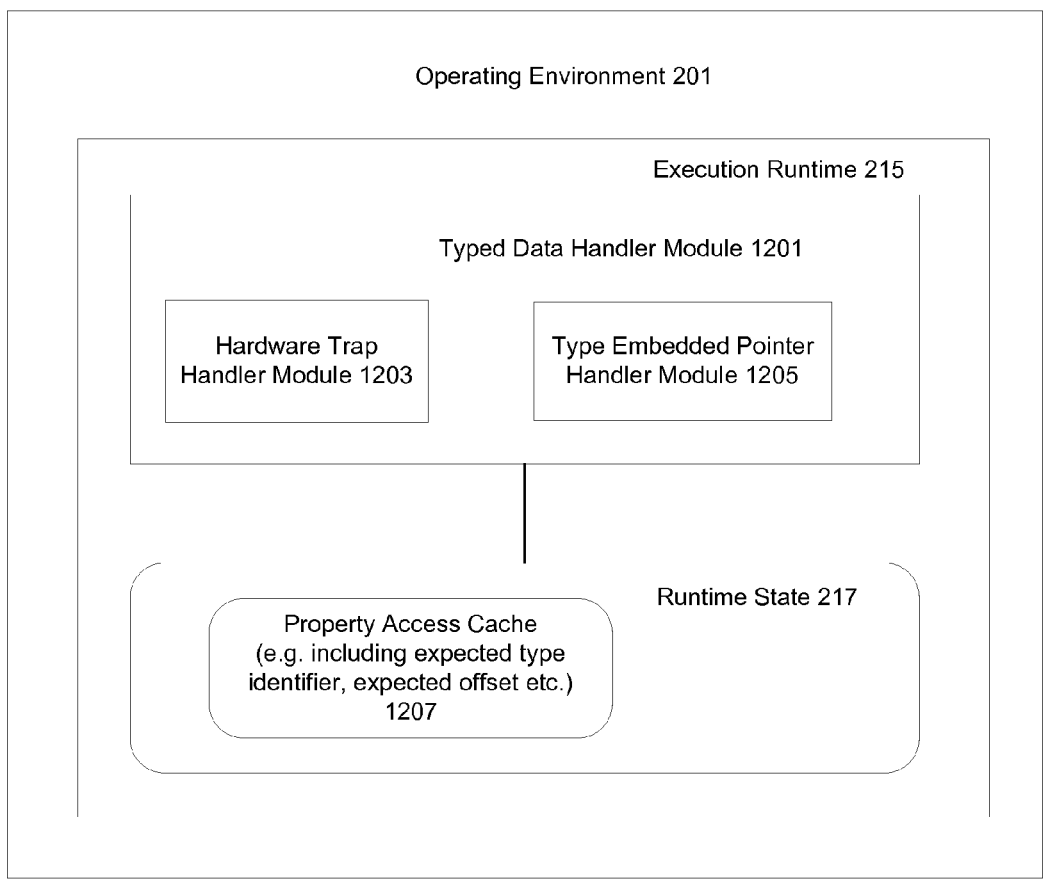
FIG. 12 is a block diagram illustrating one embodiment of a system for accessing a data of a certain type without compare and branch operations.

FIG. 12 is a block diagram illustrating one embodiment of a system for accessing a data of a certain type without compare and branch operations. For example, system 1200 may include some components of system 200 of FIG. 2. In one embodiment, system 1200 may include typed data handler module 1201 for accessing typed data in runtime 215 hosted by operating environment 201. Type embedded pointer handler module 1205 may configure a pointer to access typed data while checking whether the typed data of a know type leveraging hardware based mechanism without executing additional code (e.g. compare and branch code).

In one embodiment, property access cache 1207 may provide cached (or expected) type identifier and/or cached (or expected) address offset for accessing object. Data access (or retrieval) operations may be performed based on type embedded pointer handler module 1205 using property access cache 1207 without extra cost of loading and/or comparison operations to determine a type and/or a memory address offset to access a target object property. In one embodiment, hardware trap handler module 1203 may be registered to be activated or executed if a hardware trap occurs when, for example, a target data accessed using a pointer configured using an expected type in property access cached 1207 is different from the expected type.

Selective Randomization for Non-Deterministically Compiled Code

Runtime compiler (such as JIT compiler) may selectively and randomly introduce nondeterministic elements to generate an unpredictable compiled code for a source code (e.g. a JavaScript code remotely fetched) to protect against potential execution of un-trusted code embedded inside the source code. Separate compilations on a common source code by the runtime compiler may result in different unpredictable compiled codes without predictability between each other. The runtime compiler may be configured to vary degrees of protection (or randomness) desired and amount of overhead incurred in the unpredictable compiled code. For example, nondeterministic elements may be selectively applied randomly at different portions of a compiled code based on non-deterministic decisions. Thus, possible deterministic behavior of a code generator in the runtime compiler may be reduced.

In one embodiment, a runtime compiler may heuristically morph machine instructions of a regular compiled code in a random manner (e.g. a random spray manner) to generate an unpredictable compiled code. Heuristic evaluations may be dynamically applied to non-deterministically decide whether to introduce unpredictability at different portions of the regular compiled code of a source code. In one embodiment, heuristic evaluations may assign an amount of trustworthiness to a block of code based on static or dynamic measures or analysis of the source code as it is being compiled.

For example, each unit of code (e.g. a value, a constant etc.) compiled from a source code may be designated as either trusted or un-trusted. Total sizes of trusted code (e.g. number of bytes) and un-trusted code may be dynamically maintained to provide a heuristic measure of a ratio between trusted code and un-trusted code encountered at some point in time during compilation. Optionally or additionally, heuristic measures may include number of function block codes (or functions) which have already been emitted (e.g. generated as part of unpredictable compiled code), size of a function block code, or other applicable measures. Typically, the larger in size a function block code is, the less likely the function block code can be trusted. Similarly, the more functions a source code includes, the less trust it may be ascribed to.

In one embodiment, heuristic measures of trustworthiness for a code (e.g. a block of compiled code) may be combined to determine whether to perform randomization operations on the code as part of unpredictable compiled code. The determination may be based on outcome of a random function. The behavior of the random function may result in less likelihood to perform the randomization operations in proportion to amount of trust estimated based on the heuristic measures. The random function may provide non-deterministic properties or unpredictability in an unpredictable compiled code. For example, the portions of the regular compiled code to be randomized may be unpredictable according to the random function.

In some embodiments, a proportion of un-trusted bytes that have been emitted in a given instruction stream may be tracked during JIT compilation. The proportion may be used as a weighting factor to decide whether to apply randomization operations to protect the generated code. This decision may be made on the basis of a set of heuristics that may be varied per-environment depending on the degree to which the environment is susceptible to these attacks, and the output of a random process. Any deterministic factor in selecting which portions of the code to apply randomization operations (or hardening points) may be prevented.

Exemplary randomization operations may include NOP (no op) padding operations, randomized instruction selections, constant blinding operations, or other applicable code randomization operations. NOP padding operations may be performed (e.g. via a code generator of a runtime compiler) to randomly generate instructions that have no effect on execution other than to change the spacing between instructions. Randomized instruction selection operations can make use of the fact that many instructions may be encoded differently, or be substituted with other instructions that have the same result (e.g. subtracting a positive constant vs adding a negative constant). Constant blinding operations may be performed to replace a constant (e.g. used by a attacker) with another constant that was generated by a reversible operation, followed by code to reverse the transformation.

Selective randomization in a runtime compiler may effectively block attacker's attempt to execute an un-trusted code embedded inside a source code (e.g. a JIT Spray attack) while at the same time limit resource overhead incurred (e.g. in code size, total runtime and/or memory space required). Although selective randomization may apply randomization operations (e.g. constant blinding operations) to a certain subset of code (e.g. certain constants instead of all constants of the code), the randomness and unpredictability introduced in the emitted compiled code can prevent practical attacks, such as JIT Spray attacks or other attacks. For example, the code generator may not be forced to produce instructions to be interpreted by a processor as the attacker expects.

Figure 13:
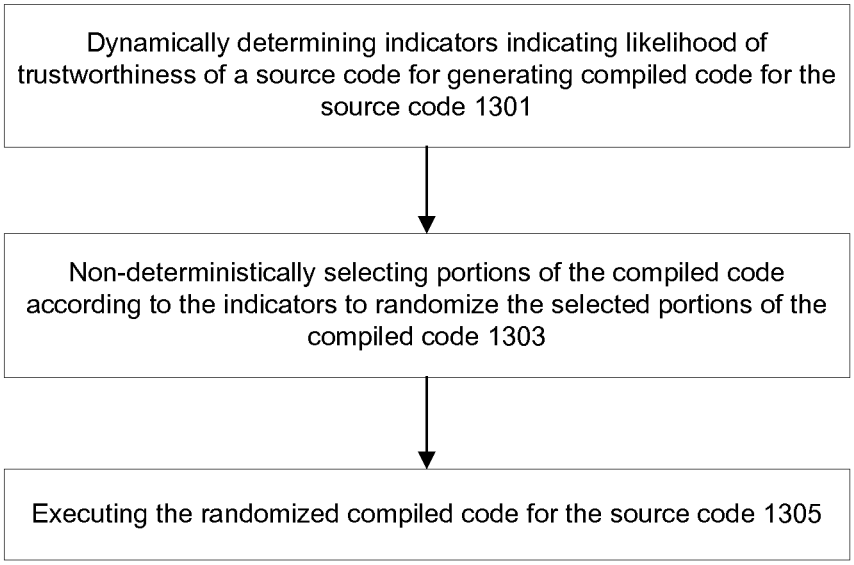
FIG. 13 is a flow diagram illustrating one embodiment of a process to selectively randomize a compiled code from a source code in a non-deterministic manner.

FIG. 13 is a flow diagram illustrating one embodiment of a process to selectively randomize a compiled code from a source code in a non-deterministic manner. Exemplary process 1300 may be performed by a processing logic that may include hardware, software or a combination of both. For example, process 1300 may be performed by some components of system 200 of FIG. 2. At block 1301, the processing logic of process 1300 may dynamically determine heuristic indicators indicating likelihood of trustworthiness of a source code for generating compiled code for the source code. A heuristic indicator may indicate whether a portion of a code (e.g. a value created in the code) is trusted or not, amount of trusted code, amount of un-trusted code, relative size between trust and un-trusted code, total size of a function block of code, heuristic environmental settings, or other applicable heuristic estimation.

At block 1303, the processing logic of process 1300 may non-deterministically select portions of a compiled code according to heuristic indicators. The processing logic of process 1300 may randomize the selected portions of the compiled code to introduce unpredictability to the randomized compiled code without incurring execution cost in unselected portions of the compiled code which are not randomized. The randomized compiled code for a source code may not be predicted from a separate compiled code of the source code. At block 1305, the processing logic of process 1300 may execute the randomized compile code compiled from a source code without executing potential un-trusted code embedded inside the source code.

FIG. 14 is a flow diagram illustrating one embodiment of a process to emit executable code non-deterministically randomized from a compiled code stream of a source code. Exemplary process 1400 may be performed by a processing logic that may include hardware, software or a combination of both. For example, process 1400 may be performed by some components of system 200 of FIG. 2. At block 1401, in one embodiment, the processing logic of process 1400 may dynamically track a proportion of un-trusted code vs. trusted code in an already emitted code stream (e.g. to emit a next code to the code stream) for generating executable code. The processing logic of process 1400 may compile a source code (e.g. a JavaScript code) to the executable code during runtime.

At block 1403, the processing logic of process 1400 may determine if a next code ready for emission is a trusted or not. For example, the next code may be a code block (e.g. an instruction) next to an already emitted code stream in a compiled code. The next code may not be trusted, for example, with a value or constant created or specified from a source code which is not trusted (received or retrieved from an unverified source). Alternatively a value created or controlled by a compiler, such as a built in constant for a programming language, may be trusted.

If the next code is not trusted at block 1405, the processing logic of process 1400 may randomly determine whether to morph the next code, for example, based on a proportion of un-trusted code vs. trusted code dynamically tracked. The processing logic of process 1400 may selectively perform randomization operations to randomize or morph the next code to allow non-deterministic adjustment of amount of randomization in an emitted code stream for improving execution performance of a randomized compiled code. For example, the higher the proportion of un-trusted code, the more likely the next code may be randomized.

At block 1407, if a next code is selected for randomization, the processing logic of process 1400 may perform one or more randomization operations on the next code to hide potential un-trusted executable instructions embedded in the next code. A randomization operation may be a constant blinding operation, NOP padding operation, instruction randomizing operations, or other suitable operations for the next code. The processing logic of process 1400 may emit the randomized code to a code stream for execution at block 1409.

FIGS. 15A-15B illustrate examples of just-in-time compilation with scattered randomization operations according to certain embodiments described herein. Turning now to FIG. 15A, code block (or instruction) 1501 may include un-trusted constant value 1. A randomization operation, such as constant blinding operation may be selectively applied to randomize or morph code block 1501 into code block 1503 using an arbitrary number 57382 to perform the same function as block 1501. Potential hidden executable instructions embedded via un-trusted value 1 in code block 1501 may be prevented from being executed in code block 1503.

Example 1500B describes exemplary operations to selectively randomize compiled code to introduce predictability in a cost effective manner. At 1505, a heuristic measure is calculated for a proportion of un-trusted content vs. trusted content based on a total number (or bytes) of un-trusted values and a total number of trusted values currently encountered in a compiled code stream. At 1507, a random selection is performed to determine whether to apply random operations to randomize a code (or harden a value) to be emitted. In one embodiment, as the proportion of un-trusted content becomes higher, the likelihood of randomizing the code may increase. By involving a random number at 1507, the selection operation, and thus, the emitted compiled code, may become non-deterministic or unpredictable.

In some embodiments, a proportion of un-trusted code may be estimated to indicate a ratio of un-trusted code size and a total size of the code (both trusted and un-trusted) currently encountered. Function randomNumber at 1507 may return a random value between 0 and 1. In one embodiment, if the ratio indicated is greater than the random value returned, the current un-trusted code may be hardened (or randomized). Thus, the higher the proportion of un-trusted code, the more likely the current un-trusted code may be hardened for emission.

In one embodiment, function emit (e.g. at 1509) may pass a byte through to an instruction stream without modification. Function emitHardenedValue at 1511 may perform one or more randomization operations to harden the value being emitted. The randomization operations applied may not be predictable by an attacker. Function decayUntrustedByteCount at 1513 may apply a decay factor to adjust (e.g. dynamically reduce) the total number of un-trusted values encountered (e.g. untrustedBytes).

Example 1500B may include configurable parameters or functions based on heuristically determined environmental settings (e.g. based on where a source code is received, which version of hosting operating system, user inputs or other applicable settings) to adjust, for example, attacker protection effectiveness vs code execution efficiency. For example, decay factor at 1513 may be applied to prevent penalizing all large pieces of code, as potential hidden un-trusted code planted by an attacker may have already been broken after emitting a harden value. Without applying the decay factor (e.g. decayUntrustedByteCount), operations in example 1500B may eventually enter a state where almost all values of the compiled code are hardened. Similarly, rapid decay of the total number of un-trusted values may result in sufficiently large streams of unhardened values for an attacker to mount a successful attack. Thus, decayUntrustedByteCount at line 1513 may apply a decay factor that has been determined appropriate for the target environment, e.g. via EnviornmentSafetyHeuristic at 1507 for the environmental settings.

Figure 16:
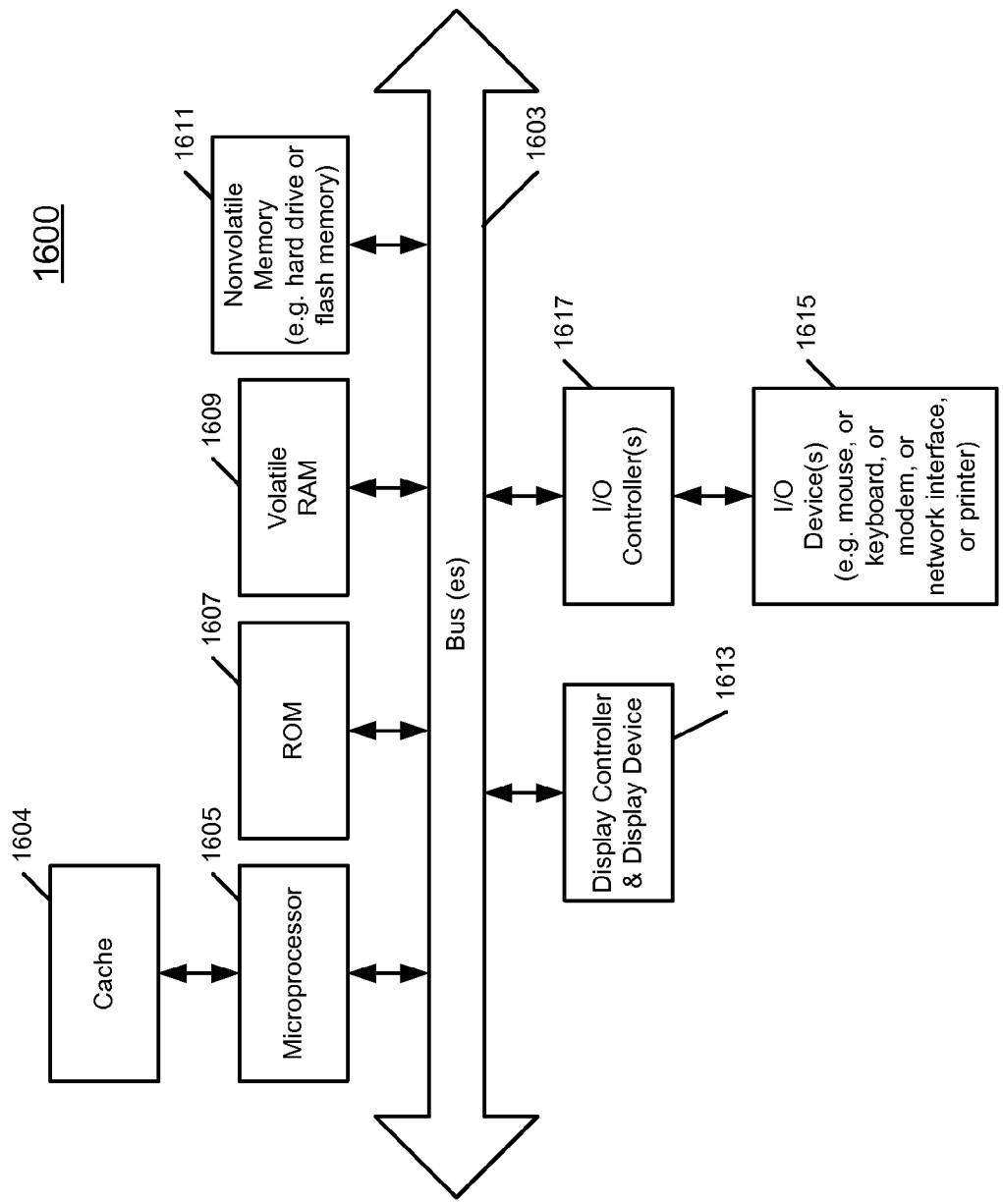
FIG. 16 illustrates one example of a data processing system such as a computer system, which may be used in conjunction with the embodiments described herein.

FIG. 16 shows one example of a data processing system, such as a computer system, which may be used with one embodiment the present invention. For example, system 2 of FIG. 2 may be implemented as a part of the system shown in FIG. 16. Note that while FIG. 16 illustrates various components of a computer system, it is not intended to represent any particular architecture or manner of interconnecting the components as such details are not germane to the present invention. It will also be appreciated that network computers and other data processing systems which have fewer components or perhaps more components may also be used with the present invention.

As shown in FIG. 16, the computer system 1600, which is a form of a data processing system, includes a bus 1603 which is coupled to a microprocessor(s) 1605 and a ROM (Read Only Memory) 1607 and volatile RAM 1609 and a non-volatile memory 1611. The microprocessor 1605 may retrieve the instructions from the memories 1607, 1609, 1611 and execute the instructions to perform operations described above. The bus 1603 interconnects these various components together and also interconnects these components 1605, 1607, 1609, and 1611 to a display controller and display device 1613 and to peripheral devices such as input/output (I/O) devices which may be mice, keyboards, modems, network interfaces, printers and other devices which are well known in the art. Typically, the input/output devices 1615 are coupled to the system through input/output controllers 1617. The volatile RAM (Random Access Memory) 1609 is typically implemented as dynamic RAM (DRAM) which requires power continually in order to refresh or maintain the data in the memory.

The mass storage 1611 is typically a magnetic hard drive or a magnetic optical drive or an optical drive or a DVD RAM or a flash memory or other types of memory systems which maintain data (e.g. large amounts of data) even after power is removed from the system. Typically, the mass storage 1611 will also be a random access memory although this is not required. While FIG. 16 shows that the mass storage 1611 is a local device coupled directly to the rest of the components in the data processing system, it will be appreciated that the present invention may utilize a non-volatile memory which is remote from the system, such as a network storage device which is coupled to the data processing system through a network interface such as a modem or Ethernet interface or wireless networking interface. The bus 1603 may include one or more buses connected to each other through various bridges, controllers and/or adapters as is well known in the art.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "virtual machine" (e.g., a Java Virtual Machine), an interpreter, a Common Language Runtime, a high-level language virtual machine, etc.), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations described herein. This apparatus may be specially constructed for the required purpose, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), RAMs, EPROMs, EEPROMs, magnetic or optical cards, or any type of media suitable for storing electronic instructions, and each coupled to a computer system bus.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will be evident from the description below. In addition, the present invention is not described with reference to any particular programming language. It will be appreciated that a variety of programming languages may be used to implement the teachings of the invention as described herein.

The foregoing discussion merely describes some exemplary embodiments of the present invention. One skilled in the art will readily recognize from such discussion, the accompanying drawings and the claims that various modifications can be made without departing from the spirit and scope of the invention.

What is claimed is:

1. A machine-readable non-transitory storage medium having instructions therein, which when executed by a machine, cause the machine to perform a method, the method comprising:
    speculatively generating compiled code for portions of a source code associated with a key, wherein a code compiled from the source code includes the speculatively generated compiled code;
    executing the code during runtime with a runtime state, wherein the runtime state includes one or more hash data indexed with one or more keys including the key, wherein the key has meta data describing assertions of one or more global properties of the key related to the hash data in the runtime state;
    updating the meta data of the key to maintain consistency between the global properties of the key and the runtime state;
    determining if the speculatively generated compiled code associated with the key is invalidated by the updated meta data of the key to guard the speculatively generated compiled code for soundness without incurring lookup operations on the hash data; and
    if the speculatively generated compiled code is invalidated, updating the code for the portions of the source code associated with the key, wherein the updated code is executed without executing the speculatively generated compiled code.

2. The medium of claim 1, wherein the code is executed with an execution path directed towards the speculatively generated compiled code without performing lookup operations, and wherein the updated code is executed to redirect the execution path from the speculatively generated compiled code, the redirected execution path including lookup operations among the hash data of the runtime state.

3. The medium of claim 1, wherein the global properties of the key having values, and wherein the determination is based on whether the values satisfy certain conditions.

4. The medium of claim 3, wherein the speculative generated compiled code is based on initial values of the global properties of the key.

5. The medium of claim 4, wherein the global properties of the key indicate whether the key is used to index the hash data in the runtime state, and wherein the global properties with the initial values indicate the key is not currently used in the runtime state.

6. The medium of claim 1, wherein the one or more hash data in the runtime state are updated according to the execution of the code and wherein the meta data is updated according to the one or more hash data updated to maintain the consistency.

7. The medium of claim 1, wherein the key is profiled from the source code.

8. A machine implemented method comprising:
speculatively generating compiled code for portions of a source code associated with a key, wherein a code compiled from the source code includes the speculatively generated compiled code;
executing the code during runtime with a runtime state, wherein the runtime state includes one or more hash data indexed with one or more keys including the key, wherein the key has meta data describing assertions of one or more global properties of the key related to the hash data in the runtime state;
updating the meta data of the key to maintain consistency between the global properties of the key and the runtime state;
determining if the speculatively generated compiled code associated with the key is invalidated by the updated meta data of the key to guard the speculatively generated compiled code for soundness without incurring lookup operations on the hash data; and
if the speculatively generated compiled code is invalidated, updating the code for the portions of the source code associated with the key, wherein the updated code is executed without executing the speculatively generated compiled code.

9. The method of claim 8, wherein the code is executed with an execution path directed towards the speculatively generated compiled code without performing lookup operations, and wherein the updated code is executed to redirect the execution path from the speculatively generated compiled code, the redirected execution path including lookup operations among the hash data of the runtime state.

10. The method of claim 8, wherein the global properties of the key having values, and wherein the determination is based on whether the values satisfy certain conditions.

11. The method of claim 10, wherein the speculative generated compiled code is based on initial values of the global properties of the key.

12. The method of claim 11, wherein the global properties of the key indicate whether the key is used to index the hash data in the runtime state, and wherein the global properties with the initial values indicate the key is not currently used in the runtime state.

13. The method of claim 8, wherein the one or more hash data in the runtime state are updated according to the execution of the code and wherein the meta data is updated according to the one or more hash data updated to maintain the consistency.

14. The method of claim 8, wherein the key is profiled from the source code.

15. A computer system comprising:
a memory storing executable instructions including a code compiled from a source code;
an interface to dynamically fetch the source code; and
a processing system coupled to the memory and the interface to execute the instructions, the processing system being configured to:
speculatively generate compiled code for portions of a source code associated with a key, wherein a code compiled from the source code includes the speculatively generated compiled code,
execute the code during runtime with a runtime state, wherein the runtime state includes one or more hash data indexed with one or more keys including the key, wherein the key has meta data describing assertions of one or more global properties of the key related to the hash data in the runtime state;
update the meta data of the key to maintain consistency between the global properties of the key and the runtime state;
determine if the speculatively generated compiled code associated with the key is invalidated by the updated meta data of the key to guard the speculatively generated compiled code for soundness without incurring lookup operations on the hash data; and
if the speculatively generated compiled code is invalidated, update the code for the portions of the source code associated with the key, wherein the updated code is executed without executing the speculatively generated compiled code.

16. The system of claim 15, wherein the code is executed with an execution path directed towards the speculatively generated compiled code without performing lookup operations, and wherein the updated code is executed to redirect the execution path from the speculatively generated compiled code, the redirected execution path including lookup operations among the hash data of the runtime state.

17. The system of claim 15, wherein the global properties of the key having values, and wherein the determination is based on whether the values satisfy certain conditions.

18. The system of claim 17, wherein the speculative generated compiled code is based on initial values of the global properties of the key.

19. The system of claim 18, wherein the global properties of the key indicate whether the key is used to index the hash data in the runtime state, and wherein the global properties with the initial values indicate the key is not currently used in the runtime state.

20. The system of claim 15, wherein the one or more hash data in the runtime state are updated according to the execution of the code and wherein the meta data is updated according to the one or more hash data updated to maintain the consistency.

21. The system of claim 15, wherein the key is profiled from the source code.

* * * * *